(12) United States Patent
Danson et al.

(10) Patent No.: US 10,262,268 B2
(45) Date of Patent: Apr. 16, 2019

(54) PREDICTIVE ANALYTIC SYSTEMS AND METHODS

(71) Applicant: Mattersight Corporation, Chicago, IL (US)

(72) Inventors: Christopher Danson, Austin, TX (US); Brittney Lynn McIngvale, Chicago, IL (US); Alain Stephan, Glenview, IL (US); Tomasz Stadnik, Chicago, IL (US); Samantha Shruti Desikan, Oak Park, IL (US); Roger Warford, Hoschton, GA (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

(21) Appl. No.: 14/045,968

(22) Filed: Oct. 4, 2013

(65) Prior Publication Data

US 2015/0100528 A1    Apr. 9, 2015

(51) Int. Cl.
*G06N 5/04* (2006.01)

(52) U.S. Cl.
CPC ..................... *G06N 5/04* (2013.01)

(58) Field of Classification Search
USPC .......................................................... 706/21
See application file for complete search history.

(56) References Cited

U.S. PATENT DOCUMENTS

| | | |
|---|---|---|
| 5,684,872 A | 11/1997 | Flockhart et al. |
| 8,295,471 B2 | 10/2012 | Spottiswoode et al. |
| 8,326,643 B1 | 12/2012 | Eshkenazi et al. |
| 8,379,830 B1 | 2/2013 | Naik et al. |
| 8,412,736 B1 | 4/2013 | Arnold et al. |
| 2002/0116253 A1* | 8/2002 | Coyne et al. ............... 705/10 |
| 2002/0141561 A1 | 10/2002 | Duncan et al. |
| 2002/0169606 A1 | 11/2002 | Bantz et al. |
| 2003/0185379 A1 | 10/2003 | O'Connor et al. |
| 2005/0105712 A1 | 5/2005 | Williams et al. |
| 2006/0262919 A1 | 11/2006 | Danson et al. |
| 2007/0124385 A1* | 5/2007 | Denny et al. ............... 709/206 |
| 2008/0167934 A1 | 7/2008 | Rani et al. |
| 2008/0189171 A1 | 8/2008 | Wasserblat et al. |
| 2008/0195659 A1 | 8/2008 | Rawle |
| 2009/0030848 A1* | 1/2009 | Wendel ........................ 705/80 |
| 2009/0222313 A1 | 9/2009 | Kannan et al. |
| 2010/0009330 A1 | 1/2010 | Yaskin |

(Continued)

FOREIGN PATENT DOCUMENTS

| | | |
|---|---|---|
| KR | 20040051258 | 6/2004 |
| WO | WO 2003/012704 A1 | 2/2003 |
| WO | WO 2005/114474 A1 | 12/2005 |

*Primary Examiner* — Robert A Cassity
*Assistant Examiner* — Michael Zidanic
(74) *Attorney, Agent, or Firm* — Haynes and Boone, LLP (57) ABSTRACT

The methods, apparatus, and systems described herein facilitate decision-making by providing predictions of outcomes and behaviors. The methods include receiving a communication between an agent and a prospect, analyzing density of keywords in a text version of the communication to determine the type of communication and amount of value time, determining if the communication is a first meaningful contact based on the type of communication and amount of value time, and predicting a likelihood of a prospect's action based on the determination.

28 Claims, 4 Drawing Sheets

(56) References Cited

U.S. PATENT DOCUMENTS

| | | |
|---|---|---|
| 2010/0332287 A1 | 12/2010 | Gates et al. |
| 2011/0058028 A1* | 3/2011 | Sakai ............................ 348/77 |
| 2011/0060611 A1 | 3/2011 | Metz et al. |
| 2011/0246920 A1* | 10/2011 | Lebrun ........................ 715/769 |
| 2011/0249811 A1 | 10/2011 | Conway et al. |
| 2012/0177196 A1 | 7/2012 | Geva et al. |
| 2012/0224680 A1 | 9/2012 | Spottiswoode et al. |
| 2012/0257518 A1 | 10/2012 | Erhart et al. |
| 2012/0278091 A1 | 11/2012 | Yaseen et al. |

\* cited by examiner

PREDICTIVE ANALYTIC SYSTEMS AND METHODS

TECHNICAL FIELD

The present disclosure generally relates to methods, apparatus, and systems that use predictive analytics, and more particularly to its use for predicting the likelihood of certain behavior and outcomes.

BACKGROUND OF THE DISCLOSURE

Organizations today are continually increasing their use of predictive analytics to more accurately predict their business outcomes, to improve business performance, and to increase profitability. Common and yet also highly strategic predictive modeling applications include fraud detection, rate making, credit scoring, customer retention, customer lifetime value, customer attrition/churn, and marketing response models.

Predictive analytics generally refer to techniques for extracting information from data to build a model that can predict an output from a given input. Predicting an output can include predicting future trends or behavior patterns. As a result of applying analytics, organizations can better understand business needs and issues, discover causes and opportunities, predict risk levels and events, take steps to prevent risks and events, and perform other similar activities that are beneficial to the organization.

Customer service agents interact with potential customers, clients, or purchasers, i.e., prospects, frequently. During the interaction, useful information can be gathered about the prospect, such as personality type, demographic information, amount of interest, likelihood of sale, etc. Current methods and systems do not use this gathered information to predict how the prospect will behave, or to tailor future interactions with the prospect. Accordingly, improved methods and systems are needed.

SUMMARY

The present disclosure seeks to predict future behavior, outcomes, or events using predictive analytics. The present methods extract information from data and use it to predict trends and behavior patterns. The methods rely on capturing relationships between different variables or predictors and exploiting them to predict an unknown outcome.

In one aspect, the present disclosure relates to a system for predicting actions of a prospect. The system includes a node that includes a processor and a computer readable medium operably coupled thereto, and the computer readable medium includes a plurality of instructions stored in association therewith that are accessible to, and executable by, the processor. The plurality of instructions include instructions, that when executed, receive a communication between an agent and a prospect; instructions, that when executed, apply linguistic analysis to a text version of the communication to determine the type of communication and amount of value time; instructions, that when executed, determine if the communication is a meaningful contact based on the type of communication and amount of value time; and instructions, that when executed, predict a likelihood of a prospect's action based on the determination.

In a second aspect, the present disclosure relates to a method for predicting actions of a prospect. The method includes receiving a communication having a density of keywords between an agent and a prospect; analyzing density of keywords in a text version of the communication to determine the type of communication and amount of value time; determining if the communication is a first meaningful contact based on the type of communication and amount of value time; and predicting a likelihood of a prospect's action based on the determination.

In a third aspect, the present disclosure relates to a computer readable medium that includes a plurality of instructions. The plurality of instructions include instructions, that when executed, receive a communication having a density of keywords between an agent and a prospect; instructions, that when executed, search for keywords and phrases in a text version of the communication to determine the type of communication and amount of value time; instructions, that when executed, measure a level of engagement between the agent and the prospect; instructions, that when executed, determine if the communication is a meaningful contact based on the type of communication, amount of value time, and level of engagement; and instructions, that when executed, predict a likelihood of a prospect's action based on the determination.

In a fourth aspect, the present disclosure relates to an apparatus for predicting actions of a prospect that includes a database module adapted to receive a communication between an agent and a prospect; a scoring module adapted to apply at least one linguistic algorithm to a text version of the communication to determine if the communication is a meaningful contact; and a predictive module adapted to use the determination to predict the likelihood of a prospect's actions.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

The present disclosure advantageously uses predictive models and methods to exploit historical and transactional data to make predictions about future, unknown events. These predictions guide organizations and businesses in making decisions, including how best to use and allocate their resources. Generally, predictive models accept one or more inputs and produce a corresponding output and a score. The predictive models are generated using a training function and a set of training data to estimate the probability of a predicted outcome.

The methods include receiving a communication between an agent and a prospect, determining the type of communication and the amount of value time by analyzing the density of keywords in the text of the communication, determining if the communication is a first meaningful contact based on the type of communication and amount of value time, and predicting the likelihood of a prospect action based on the determination. The term "action" or "actions" is meant herein to refer to any action, interaction, reaction, effort, decision, or lack of action. The term "keywords" is used herein to include individual keywords, as well as terms, phrases, or the like.

Systems and apparatuses for carrying out these methods are also part of the present disclosure. An exemplary system to predict a prospect's action includes, for example, a node including a processor and a computer readable medium operably coupled thereto, the computer readable medium including a plurality of instructions stored in association therewith that are accessible to, and executable by, the processor, where the plurality of instructions includes instructions, that when executed, receive a communication between an agent and a prospect, apply linguistic analysis to text of the communication to determine the type of communication and amount of value time, determine if the communication is a meaningful contact based on the type of communication and amount of value time, and predict a likelihood of a prospect's action based on the determination.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Figure 1:
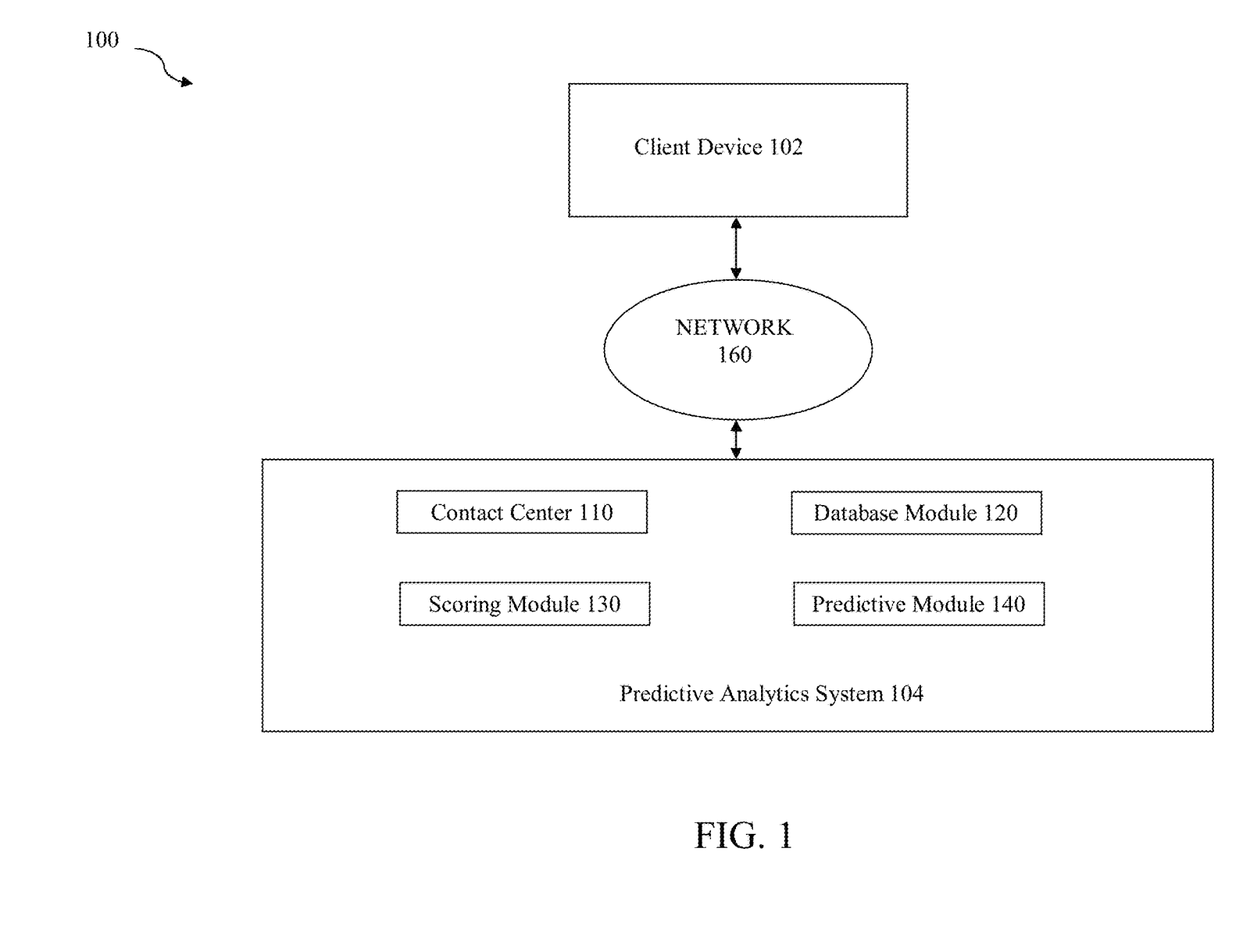
FIG. 1 is a block diagram of an embodiment of a system for predicting an action of a prospect according to various aspects of the present disclosure.

FIG. 1 depicts a schematic block diagram of a system 100 in accordance with one or more embodiments of the present disclosure. The system 100 includes a client device 102 and predictive analytics system 104 in communication over a network 160. Although only one client device is shown in FIG. 1, it should be understood that multiple client devices may be in communication with the predictive analytics system 104, either concurrently or sequentially, or both. As shown in FIG. 1, the predictive analytics system 104 includes contact center 110, database module 120, scoring module 130, and predictive module 140. In one or more embodiments, the predictive analytics system 104 is configured as a networked system (e.g., an Internet web-based system accessible by any client device worldwide) for providing predictive outputs to client device 102. In various examples, client device 102 may be implemented by any system suitable for communication, such as a wireless telephone (e.g., cellular or mobile phone), a tablet, a personal digital assistant (PDA), a personal computer, a notebook computer, and/or various other generally known types of wired and/or wireless computing devices.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. Any suitable network to connect the client device 102 and predictive analytics system 104 may be used.

The client device 102, in various embodiments, may be implemented using any appropriate combination of hardware and/or software configured for wired and/or wireless communication over the network 160. The client device 102, in one embodiment, may be utilized by a user (e.g., business or organization) to communicate with the predictive analytics system 104 over the network 160.

The client device 102, in one embodiment, includes a user interface application (not shown) to conduct transactions with the predictive analytics system 104 over the network 160. In one implementation, the user interface application comprises a software program, such as a graphical user interface (GUI), executable by a processor that is configured to interface and communicate with the predictive analytics system 104 via the network 160. In another implementation, the user interface application comprises a browser module that provides a network interface to browse information available over the network 160. For example, the user interface application may be implemented, in part, as a web browser to view information available over the network 160.

A client entity—an individual or a group of people or a company, for example—may desire a trained predictive model that can receive input data from client device 102 belonging to or under the control of the client entity and generate a predictive output. To train a particular predictive model can require a significant volume of training data, for example, one or more gigabytes of data. The client device 102 may be unable to efficiently manage such a large volume of data. Further, selecting and tuning an effective predictive model from the variety of available types of models can require skill and expertise that an operator of the client device 102 may not possess. Advantageously, predictive analytics system 104 has the capacity and ability to provide and train predictive models, as well as provide predictive outputs to client device 102.

In one embodiment, the system 100 described herein allows training data to be uploaded from the client device 102 to the predictive analytics system 104 over the network 160. The database module 120 can receive, store and manage large volumes of data. The predictive model can be trained, and the trained model made available to users who have access to the predictive analytics system 104 and, optionally, to users with permission from the client entity that provided the training data for the model. Access and permission can be controlled using any available technique(s) for user authorization and authentication and for access control, if restricting access to the model is desired. The client device 102 can transmit prediction requests over the network 160 to predictive analytics system 104. The trained model executing in the predictive module 140 receives the prediction request, input data and request for a predictive output, and generates the predictive output. The predictive output can be provided to the client device 102, for example, over the network 160.

The contact center 110 can include any facility or system server suitable for receiving and recording electronic communications from prospects, e.g., potential customers, clients, or purchasers. Such prospect communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications, or any other suitable network that may be the same or different type of network than network 160. The contact center 110 of the present disclosure is adapted to receive and record varying electronic communications and data formats that represent an interaction that may occur between a prospect (or caller) and an agent during fulfillment of a prospect and agent transaction. In one embodiment, the contact center 110 records all of the prospect calls in uncompressed audio formats. In the illustrated embodiment, prospects communicate with one or more agents associated with the contact center 110 via multiple different communication networks such as a public switched telephone network (PSTN) or the Internet. For example, a prospect may initiate an interaction session through traditional telephones, a fax machine, a cellular (i.e., mobile) telephone, a personal computing device with a modem, or other legacy communication device via the PSTN. Further, the contact center 110 may accept internet-based interaction sessions from personal computing devices, VoIP telephones, and internet-enabled smartphones and personal digital assistants (PDAs).

Figure 2:
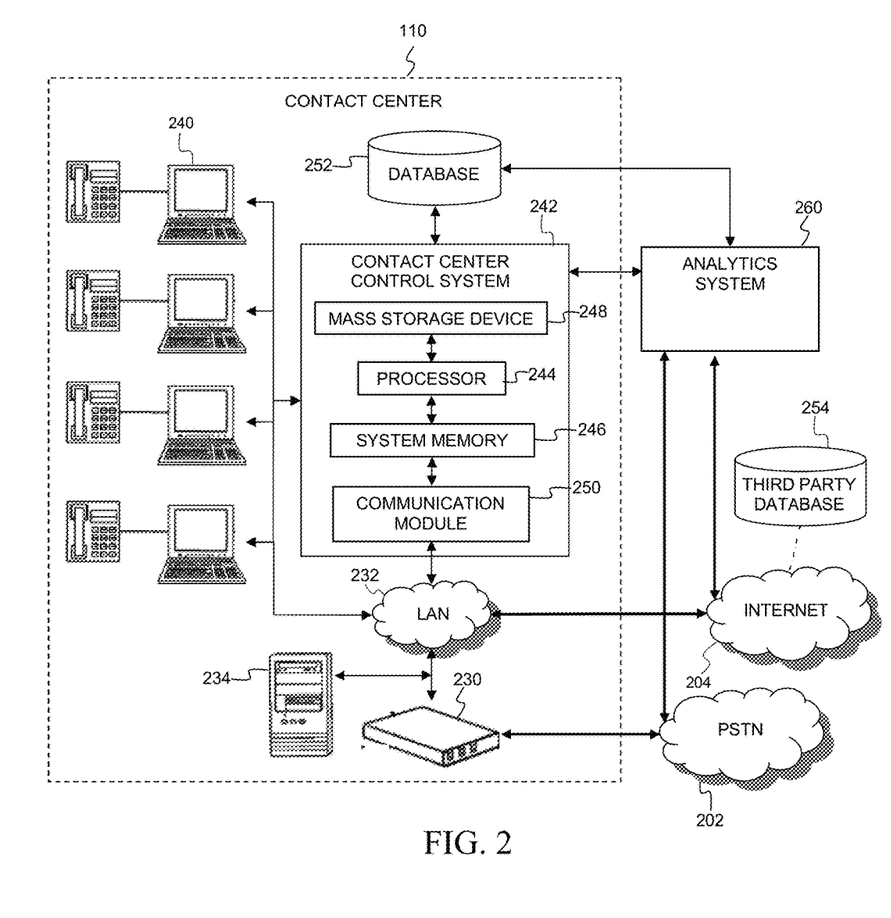
FIG. 2 is a detailed block diagram of the contact center of FIG. 1 according to aspects of the present disclosure.

FIG. 2 is a more detailed block diagram of an embodiment of the contact center 110 according to aspects of the present disclosure. As shown in FIG. 2, the contact center 110 is communicatively coupled to the PSTN 202 via a distributed private branch exchange (PBX) switch 230. The PBX switch 230 provides an interface between the PSTN 202 and a local area network (LAN) 232 within the contact center 110. In general, the PBX switch 230 connects trunk and line station interfaces of the PSTN 202 to components communicatively coupled to the LAN 232. The PBX switch 230 may be implemented with hardware or virtually. A hardware-based PBX may be implemented in equipment located local to the user of the PBX system. In contrast, a virtual PBX may be implemented, e.g., in equipment located at a central telephone service provider that delivers PBX functionality as a service over the PSTN 202. Additionally, in one embodiment, the PBX switch 230 may be controlled by software stored on a telephony server 234 coupled to the PBX switch. In another embodiment, the PBX switch 230 may be integrated within telephony server 234. The telephony server 234 incorporates PBX control software to control the initiation and termination of connections between telephones within the contact center 110 and outside trunk connections to the PSTN 202. In addition, the software may monitor the status of all telephone stations coupled to the LAN 232 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 232. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 234 includes a trunk interface that utilizes conventional telephony trunk transmission supervision and signaling protocols required to interface with the outside trunk circuits from the PSTN 202. The trunk lines carry various types of telephony signals such as transmission supervision and signaling, audio, fax, or modem data to provide plain old telephone service (POTS). In addition, the trunk lines may carry other communication formats such Ti, ISDN or fiber service to provide telephony or multimedia data images, video, text or audio.

The telephony server 234 includes hardware and software components to interface with the LAN 232 of the contact center 110. In one embodiment, the LAN 232 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 110 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 202 to its destination. Conversely, an incoming call from a customer over the PSTN 202 may be routed to the IP/PBX-PSTN gateway, which translates the conventional telephone protocol to H.323 protocol so that it may be routed to a VoIP-enable phone or computer within the contact center 110.

The contact center 110 can be further communicatively coupled to the Internet 204 via hardware and software components within the LAN 232. One of ordinary skill in the art would recognize that the LAN 232 and the connections between the contact center 110 and external networks such as the PSTN 202 and the Internet 204 as illustrated by FIG. 2 have been simplified for the sake of clarity and the contact center 110 may include various additional and/or different software and hardware networking components such as routers, switches, gateways, network bridges, hubs, and legacy telephony equipment.

As shown in FIG. 2, the contact center 110 includes a plurality of agent workstations 240 that enable agents employed by the contact center 110 to engage in prospect interactions over a plurality of communication channels. In one embodiment, each agent workstation 240 may include at least a telephone and a computer workstation. In other embodiments, each agent workstation 240 may include a computer workstation that provides both computing and telephony functionality. Through the workstations 240, the agents may engage in telephone (including VOIP) conversations with the prospect, respond to email inquiries, receive faxes, engage in instant message conversations, respond to website-based inquires, video chat with a prospect, and otherwise participate in various prospect interaction sessions across one or more channels. Further, in some embodiments, the agent workstations 240 may be remotely located from the contact center 110, for example, in another city, state, or country. Alternatively, in some embodiments, an agent may be a software-based application configured to interact in some manner with a prospect. An exemplary software-based application as an agent is an online chat program designed to interpret prospect inquiries and respond with pre-programmed answers.

The contact center 110 further includes a contact center control system 242 that is generally configured to provide recording, voice analysis, behavioral analysis, storage, and other processing functionality to the contact center 110. In the illustrated embodiment, the contact center control system 242 is an information handling system such as a computer, server, workstation, mainframe computer, or other suitable computing device. In other embodiments, the control system 242 may be a plurality of communicatively coupled computing devices coordinated to provide the above functionality for the contact center 110. The control system 242 includes a processor 244 that is communicatively coupled to a system memory 246, a mass storage device 248, and a communication module 250. The processor 244 can be any custom made or commercially available processor, a central processing unit (CPU), an auxiliary processor among several processors associated with the control system 242, a semiconductor-based microprocessor (in the form of a microchip or chip set), a macroprocessor, a collection of communicatively coupled processors, or any device for executing software instructions. The system memory 246 provides the processor 244 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 248. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 250 is operable to receive and transmit contact center-related data between local and remote networked systems and communicate information such as customer interaction recordings between the other components coupled to the LAN 232. Examples of communication modules may include Ethernet cards, 802.11 WiFi devices, cellular data radios, and/or other suitable devices known in the art. The contact center control system 242 may further include any number of additional components, which are omitted for simplicity, such as input and/or output (I/O) devices (or peripherals), buses, dedicated graphics controllers, storage controllers, buffers (caches), and drivers. Further, functionality described in association with the control system 242 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 242 is configured to record, collect, and analyze customer voice data and other structured and unstructured data, and other tools may be used in association therewith to increase efficiency and efficacy of the contact center 110. As an aspect of this, the control system 242 is operable to record unstructured interactions between prospects and agents occurring over different communication channels including without limitation telephone conversations, email exchanges, website postings, social media communications, smartphone application (i.e., app) communications, fax messages, instant message conversations. For example, the control system 242 may include a hardware or software-based recording server to capture the audio of a standard or VoIP telephone connection established between an agent workstation 240 and an outside customer telephone system. Further, the audio from an unstructured telephone call or video conference session may be transcribed manually or automatically and stored in association with the original audio or video. In one embodiment, multiple communication channels (i.e., multi-channel) may be used according to the invention, either in real-time to collect information, for evaluation, or both. For example, control system 242 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 242 is configured to capture structured data related to prospects, agents, and their interactions. For example, in one embodiment, a "cradle-to-grave" recording may be used to record all information related to a particular telephone call from the time the call enters the contact center to the later of: the caller hanging up, or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific prospects may be collected and associated with each prospect, including without limitation the number and length of calls placed to the contact center 110, call origination information, reasons for interactions, outcome of interactions, average hold time, agent actions during interactions with prospect(s), manager escalations during calls, types of social media interactions, number of distress events during interactions, survey results, and other interaction information. In addition to collecting interaction data associated with a prospect, the control system 242 is also operable to collect biographical profile information specific to a prospect including without limitation prospect phone number, account/policy numbers, address, employment status, income, gender, race, age, education, nationality, ethnicity, marital status, credit score, prospect "value" data (i.e., customer tenure, money spent as customer, etc.), personality type (as determined by past interactions), and other relevant prospect identification and biological information. The control system 242 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 242 that are identified above are simply examples and additional and/or different or different combinations of interaction data, prospect data, agent data, and telephony data may be collected and processed by the control system 242.

The control system 242 may store recorded and collected interaction data in a database 252, including prospect data and agent data. In certain embodiments, agent data, such as agent scores for dealing with prospects or customers, are updated daily. The database 252 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 242 may have access not only to data collected within the contact center 110 but also data made available by external sources such as a third party database 254. In certain embodiments, the control system 242 may query the third party database for prospect data such as credit reports, past transaction data, and other structured and unstructured data.

Additionally, in some embodiments, an analytics system 260 may also perform some or all of the functionality ascribed to the contact center control system 242 above. For instance, the analytics system 260 may record telephone and internet-based interactions, perform behavioral analyses, and perform other contact center-related computing tasks. The analytics system 260 may be integrated into the contact center control system 242 as a hardware or software module and share its computing resources 244, 246, 248, and 250, or it may be a separate computing system. In the latter case, the analytics system 260 includes its own processor and non-transitory computer-readable storage medium (e.g., system memory, hard drive, etc.) on which to store analytics software and other software instructions.

The multi-channel interaction data collected in the context of the control center 110 may be subject to a linguistic-based psychological behavioral model to assess the personality of prospects and agents associated with the interactions. For example, such a behavioral model may be applied to the transcription of a telephone call, instant message conversation, or email thread, between a prospect and agent to gain insight into why a specific outcome resulted from the interaction.

In one embodiment, interaction data is mined for behavioral signifiers associated with a linguistic-based psychological behavioral model. In particular, the contact center control system 242 searches for and identifies text-based keywords (i.e., behavioral signifiers) relevant to a predetermined psychological behavioral model. In a preferred embodiment, multiple channels may be mined for such behavioral signifiers. In other embodiments, the keywords can be pre-selected and optionally also associated with specific aspects of a behavioral model, such as the operative basic personality types of the behavioral model. The keywords may be selected from a pre-existing library of keywords, phrases, and/or terms that are associated with various types of communication, or the information may be collected and/or built from new data.

It is well known that certain psychological behavioral models have been developed as tools to evaluate and understand how and/or why one person or a group of people interacts with another person or group of people. One example is the Big Five inventory model (© 2000) by UC Berkeley psychologist Oliver D. John, Ph.D. Another is the Process Communication Model™ ("PCM") developed by Dr. Taibi Kahler is a preferred example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly each PCM personality type responds positively or negatively to communications that include tones or messages commonly associated with another of the PCM personality types. Thus, an understanding of a communicant's PCM personality type offers guidance as to an appropriate responsive tone or message. Exemplary methods of applying a psychological behavioral model to contact center communications are described in U.S. Pat. Nos. 7,995,717 and 8,094,803, and U.S. patent application Ser. No. 13/782,522, filed Mar. 1, 2013, entitled "Customer-Based Interaction Outcome Prediction Methods and System," the entire contents of each of which is incorporated herein in its entirety by express reference thereto.

The database module 120 is adapted to receive a communication between an agent and prospect from contact center 110. In one embodiment, the communication received is in a non-text format, and the non-text communications are converted to text before further processing.

The scoring module 130 is adapted to apply linguistic algorithms to the text of the communication and output a score. In some embodiments, this can be considered a Tier II analysis. A linguistic algorithm(s) is typically created by linguistic analysts and such algorithm(s) are typically trained using previously analyzed prospect-agent communications. In one embodiment, the analyst(s) can review communications and manually label keywords or terms that are relevant to an identified category or predictor. The algorithm is trained to check for those keywords and the number of times they are used in the communications. A more sophisticated algorithm may be used that additionally checks for use of the keywords in context. One master algorithm containing many specific algorithms may also be used.

In some embodiments, the scoring module 130 uses at least three (3) categories or predictors of a prospect action. These three (3) categories are: (1) type of communication; (2) amount of value time; and (3) level of engagement.

The "type of communication" algorithm performs a linguistic word density analysis on the text, and then assigns one type of communication based on the highest score produced by the linguistic analysis. Examples of types of communications include an inquiry, complaint, sale, order, encouragement, advice, etc. This algorithm is developed by analyzing sample communications and building (or using pre-existing) libraries of keywords, phrases, and/or terms that are associated with each type of communication.

The term "value time" is meant herein to refer to the time that is spent promoting the value of an organization, business, service, and/or product during the communication. In an exemplary embodiment, value time is measured by the time the agent, but not the prospect, spends promoting or otherwise endorsing the organization, business, service, and/ or product. This algorithm is also developed by analyzing sample communications and building a library (or using a pre-existing library) of keywords, terms, and phrases. The algorithm outputs a score, i.e., the time value or amount of time, which indicates how much time was spent on promotion.

The engagement algorithm measures the level of engagement between the agent and prospect. Unlike the previously discussed algorithms, this algorithm is not linguistic, and does not rely on the transcript of the communication. The term "engagement" is meant herein to refer to the amount of agent and prospect dialogue during the communication. The algorithm evaluates the segments of speech in the communication to determine how long the prospect was speaking continuously. The algorithm finds the engaged segments in the communication and counts the total number of engaged segments. For example, an engaged segment may be where the prospect speaks for more than three (3) seconds in a row, preferably for more than seven (7) seconds, and more preferably for more than ten (10) seconds in a row. In various embodiments, if there are four (4) or more engaged segments per communication, then the algorithm outputs a score of "high." If there are fewer than four (4) engaged segments, then the algorithm may output a score of "medium" or "low."

The predictive module 140 is adapted to use the type of communication, the amount of value time, level of engagement, and/or prospect contact history to determine if the communication is a "meaningful contact." The term "meaningful contact" is meant herein to refer to a communication for which predictive modeling gives a reliable output on a possible outcome. In some embodiments, this can be considered a Tier III analysis.

The type of communication is indicative of where in a process the prospect and agent are. For example, an inquiry is typically earlier in the process and is more likely to be the first contact. On the other hand, an encouragement communication is more likely to be later in the process, and less likely to be the first meaningful contact.

The amount of value time correlates with meaningfulness. That is, the greater the time spent on promotion, the more meaningful the contact. In an exemplary embodiment, if the value time exceeds a threshold value time, a meaningful contact has occurred. The values of the threshold are configurable based on the situation.

The level of engagement also correlates with meaningfulness. The higher the level of engagement, the more meaningful the contact. In an exemplary embodiment, if the level of engagement exceeds a threshold engagement level, a meaningful contact has occurred. The values of the threshold are configurable based on the situation.

In some embodiments, the predictive module 140 determines the number of meaningful contacts that have occurred between the prospect and agent. In an exemplary embodiment, the predictive module 140 determines if the communication is a first meaningful contact. In certain embodiments, this determination occurs in real-time while the agent and prospect are in communication, while in other embodiments it occurs in near-real-time promptly after the communication is complete, and in still other embodiments, it occurs later such as a number of minutes, hours, or days later. The fact that a meaningful contact has occurred and/or the number of meaningful contacts that have occurred can be used as an input for a predictive model relating to possible outcomes. The predictive model predicts the likelihood of a prospect achieving certain goals and taking certain actions. Besides using meaningful contacts, the predictive model can also use demographic information (e.g., address, employment status, income, gender, race, age, education, nationality, ethnicity, marital status, etc.), behavioral analytics data, and prior communications as inputs.

Figure 3:
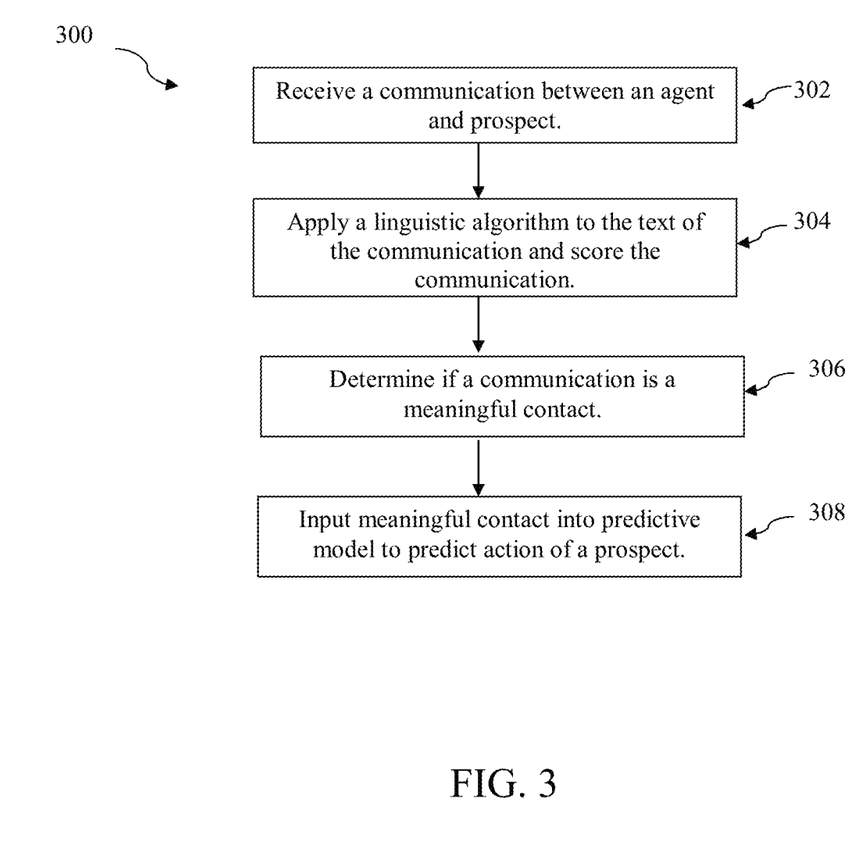
FIG. 3 is a flowchart illustrating a preferred method of predicting an action of a prospect according to aspects of the present disclosure.

An exemplary method 300 of predicting an action of a prospect according to the disclosure will now be described with respect to FIG. 3. At step 302, the database module 120 receives a communication between an agent and a prospect. In various embodiments, the communication is received from the contact center 110, but in other embodiments, the communication may be received from the client device 102. The communication may be received in any form of electronic communication, including text based (email, text, web interaction) or recorded verbal (telephonic) responses or video based responses. In various embodiments, the non-text answers are converted to text before further processing. The database module 120 may store the communication for later use.

At step 304, at least one linguistic algorithm is applied to the text of the communication and a score is generated. The algorithm looks for specific terms, keywords and phrases (i.e., groups of keywords) that indicate a relevant category or predictor (e.g., type of communication and value time) and the density of those terms in the communication. For example, terms indicative of a specific type of communication include "how do I?" or "can you help?" for an inquiry, "angry" or "displeased" for a complaint, etc. Keywords and phrases for value time will depend on the organization, business, product, and/or service that are being promoted. For example, "learn" would suggest the prospect is a student interested in an educational-type category.

In certain embodiments, the timing of when the keywords or terms are spoken in the communication is taken into consideration. For example, keywords can be restricted to specific times on a call (e.g., the first 20 seconds, the last minute, etc.) or specific types of talking segments. That is, the keyword is scored only if it occurs within a certain amount of time in the communication from another specific event.

In other embodiments, the proximity of keywords to one another or to other relevant communication events are taken into account. For instance, the algorithm may search for the word "call" within 0-3 words of the word "learn." This would capture statements such as "Called to learn more about your school" or "Called previously to learn more about your programs." In some embodiments, keywords in closer proximity are given higher scores.

In various embodiments, these terms, phrases, or keywords are stored in a library or libraries that are accessed by the scoring module 130. The library may separate the keywords, terms, and phrases into different categories (e.g., type of communication, value time, etc.). Keywords are the words previously determined to indicate the specific characteristic in the communication. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Aliases may also be given relative scores compared to a keyword, such as an alias valued at 0.6 or 1.2 of a keyword valued at 1. Also, due to the flexibility of the methods described herein, additional words, terms, and/or phrases may be added to the library at any time, such as based on additional communications, external analysis of business terminology in current news sources, or both. For example, when it becomes apparent that another word is used frequently and is just as effective as the associated keyword, the library may be updated to include this word as an acceptable alias, or may upgrade the relative value of that alias closer to 1 compared to the keyword if the algorithm tracks relative values.

The communications are scored by the scoring module 130. The scoring module 130 uses one or more linguistic algorithms that are configured to detect keywords, terms, and phrases in the communications, and the communications are scored based on the number of word hits (i.e., based on keywords, terms, phrases, etc.). The score can be assigned using any suitable grading scale such as a numeric scale, a three-level scale (i.e., high, medium, or low), an alphabetical scale or other scale created to rank the candidate's performance in a certain category. In one embodiment, a numeric scale can be used having a range of values from 1 to 10, where 1 indicates a minimum score and 10 indicates a maximum score. Other ranges can be used, such as 1 to 5 or 1 to 100, or A to C or A to F, or a combination of a numerical and letter scale to indicate different characteristics or weighting to different characteristics (e.g., an A2 is twice the importance of a lower score D1); no limitation is implied by the ranges given in this description.

In one embodiment, the score for the type of communication is the type of communication with the highest score. In another embodiment, the amount of value time is given a score of high, medium, or low. In certain embodiments, the level of engagement is also scored, to determine how engaged the prospect was in the conversation. Like value time, the score for the level of engagement can be high, medium, or low.

At step 306, the scoring module 130 takes at least the scores for type of communication and amount of value time to determine if the communication is a meaningful contact. In some embodiments, the scoring module 130 also takes the score for the level of engagement into consideration, and/or also determines the number of meaningful contacts that have occurred. For example, if the type of communication is an inquiry, the score for the amount of value time is high, and the score for the level of engagement is high, then the scoring module 130 determines that the communication is a meaningful contact, and that it is the first meaningful contact.

At step 308, the predictive module 140 takes the fact that a meaningful contact has occurred and/or the number of meaningful contacts that have occurred, and inputs this into a predictive model that outputs a likelihood that the prospect will behave in a certain way or take a certain action. The likelihoods or probabilities can then be used in decision-making processes. Other inputs that may be used by the predictive model include the demographic profile of the prospect, behavioral analysis of the prospect, and past history between the agent and the prospect.

To explain method 300 in more detail, two specific examples will be provided. In one embodiment, the methods and systems described herein are used to recruit, monitor, and retain students for educational institutions. Schools, particularly for-profit vocational or education institutions, often employ agents to respond to phone calls, web communications, or campus visits from students or prospective students. Schools will often use the same agent to make all the contacts with the prospective student until the student enrolls, and optionally even during the student's time at the educational institution.

The text version of a communication, particularly spoken communication, between a prospective student and school agent can be recorded and transcribed, and the voices of the prospective student and the agent are separately identified. In some embodiments, this can be considered a Tier I analysis. A phone number may be associated with the prospective student, and the prospective student is assigned a student identifier. Each agent is assigned an identifier, and each recording can be associated with the identifier.

Once transcribed, the communication is identified as being a particular type. A linguistic algorithm is applied to the text of the communication to determine the type of communication. For example, the communication can be an inquiry contact when a prospective student calls and no application has been submitted yet, an enrollment process contact when a prospective student and agent interact to schedule tests and submit transcripts, an encouragement contact where after the prospective student is enrolled, the agent makes sure that he or she follows through with an application or if that has been done that the prospective student starts the first course and stays in the program, or an advising contact when the agent provides advice on changes or updates to an original course or plan, addresses a complaint or issue or inquiry, or provides advice on a course.

The education value time is measured by outputting a time value that indicates how much time the agent spent talking about the value of education. In certain embodiments, the time the prospective student spends talking about education is not taken into consideration. The level of engagement between the school agent and the prospective student is also determined.

In this embodiment, once the type of communication, education value time, and level of engagement are determined, the meaningful contact analysis is performed. An occurrence of a meaningful contact and/or the number of meaningful contacts that have occurred can be used as inputs into a predictive model that provides likelihood of outcomes, such as the prospective student's likelihood to apply to school, likelihood of visiting a school, likelihood to enroll, likelihood to show up to class, likelihood to finish first in the class, and/or likelihood to graduate from a class or program. The predictive model predicts the likelihood that the prospective student will achieve these and other milestones throughout the education process and allows the educational institution to allocate resources accordingly. The predictive model can tell which students are likely to make the next milestone, and which students need the most encouragement to achieve the next milestone. For example, for a prospective student who has had four (4) or more meaningful contacts, there is a greater than 90% (e.g., 93%) chance that the student will enroll.

In certain embodiments, the predictive model continues collecting information about student attendance, participation, and grades even after enrollment to update the likelihood that the student will achieve the desired milestones. To measure categories like student participation and behavioral data, the predictive model can take inputs from on-line interactions that occur as part of a class. These interactions typically include information regarding the student such as: (1) personality type, (2) engagement, (3) student participation rates, (4) student grades, (5) number of phone calls to advisor/interactions with advisor, and (6) instructor feedback based on student performance.

Another use of the predictive model includes optimal student/teacher personality match-ups. Identifying the personality types of student and teacher early in the class assignment process will allow the model to have an impact on student class choices. The model may suggest assigning the student a complementary personality type teacher.

Besides using the predictive model in an educational environment, the model can be used to predict outcomes in a sales process. In another embodiment of method 300, the methods and systems described herein are used to assign the best suitable agent to a prospective sales lead. Once a communication between an agent and customer are transcribed, a linguistic algorithm is applied to the communication to determine the type of communication. For example, the communication can be an inquiry contact when a prospective sales lead asks about a specific product or service without purchasing it yet, a trial contact when a prospective sales lead wants to give the product or service a try before purchasing, a sales contact when the prospective sales lead is ready to purchase the product or service, or a complaint contact when the agent must address a complaint or issue.

The sales value time is measured by outputting a time value that indicates how much time the agent spent talking about the value of a product or service. The level of engagement between the agent and the prospective sales lead is also determined.

The meaningful contact analysis is then performed. The fact that a meaningful contact has occurred and/or the number of meaningful contacts that have occurred are input into a predictive model that, for example, provides the likelihood that the prospective sales lead will purchase the product or service. The predictive model can help determine which customers are ready and likely to make a purchase, which customers are ready and likely to make a specific purchase, and which customers still need more information before making a purchase, by providing a likelihood of success for each such prospect decision/inflection point. For example, a prospective sales lead who has had 4 or more meaningful contacts with an agent is very likely (e.g., 95% chance) to buy.

By using a predictive model with the first meaningful contact as an input, the model can collect information about the prospective sales lead (i.e., a prospect), and once enough information is collected, assign that prospective lead to the best agent suited to the prospective lead.

To determine the best agent suited for the prospective lead, the predictive model can use one or more of at least the following inputs: (1) agent-customer interactions to date, (2) prospective lead personality type, (3) likelihood of prospective lead to buy, and (4) agent's personality type and history with prospective lead's personality type. In a preferred embodiment, all of these inputs are used in the predictive model.

To determine the prospective lead's personality type, the predictive model can use recorded audio or text transcribed or generated from the communication, and apply an algorithm for determining personality type. The amount of audio/text will vary depending on the amount of engagement. If the prospective lead is very engaged, then it may take only about 2 to 3 minutes of audio, or a similar amount of text, to determine personality type. Alternatively, the contact center 110 (or associated analytics system) may perform this function and send the results to the predictive module 140.

The predictive model can additionally suggest that a prospective sales lead be reassigned after an initial agent flubs or makes a mistake in an interaction with a prospective sales lead, for example, due to personality type mismatch, inattentiveness to the communication, or another issue. In other embodiments, the predictive model can be used to coach or train agents on their interactions with prospects.

The methods and systems of the present invention can address a wide range of tasks and provide predictive models in response. Accordingly, the invention of the present disclosure is believed to be useful in a wide range of fields and businesses and for a wide range of users. The methods and systems of the present invention have application for providing analytic solutions in almost any field of interest and for almost any type of business or organization. Therefore, users may include business owners, system owners, customer service agents, or anyone who desires to be able to access the capabilities of the predictive analytics system disclosed herein.

The present invention significantly lowers barriers to adopting analytics as a part of everyday processes by making analytics more automated, and by delivering high-quality, repeatable results that are less subject to human error and are determined faster than when human analysis is required. The invention also provides a high degree of automation that reduces the time and resources required to perform highly complex data mining tasks or mentoring of a prospect, while providing the automatic optimization of predictive models.

In various embodiments, the predictive model relies upon a combination of Tier I, Tier II, and Tier III analysis to determine a likelihood that a prospect will take certain actions, achieve certain goals, or require intervention, as described herein.

Figure 4:
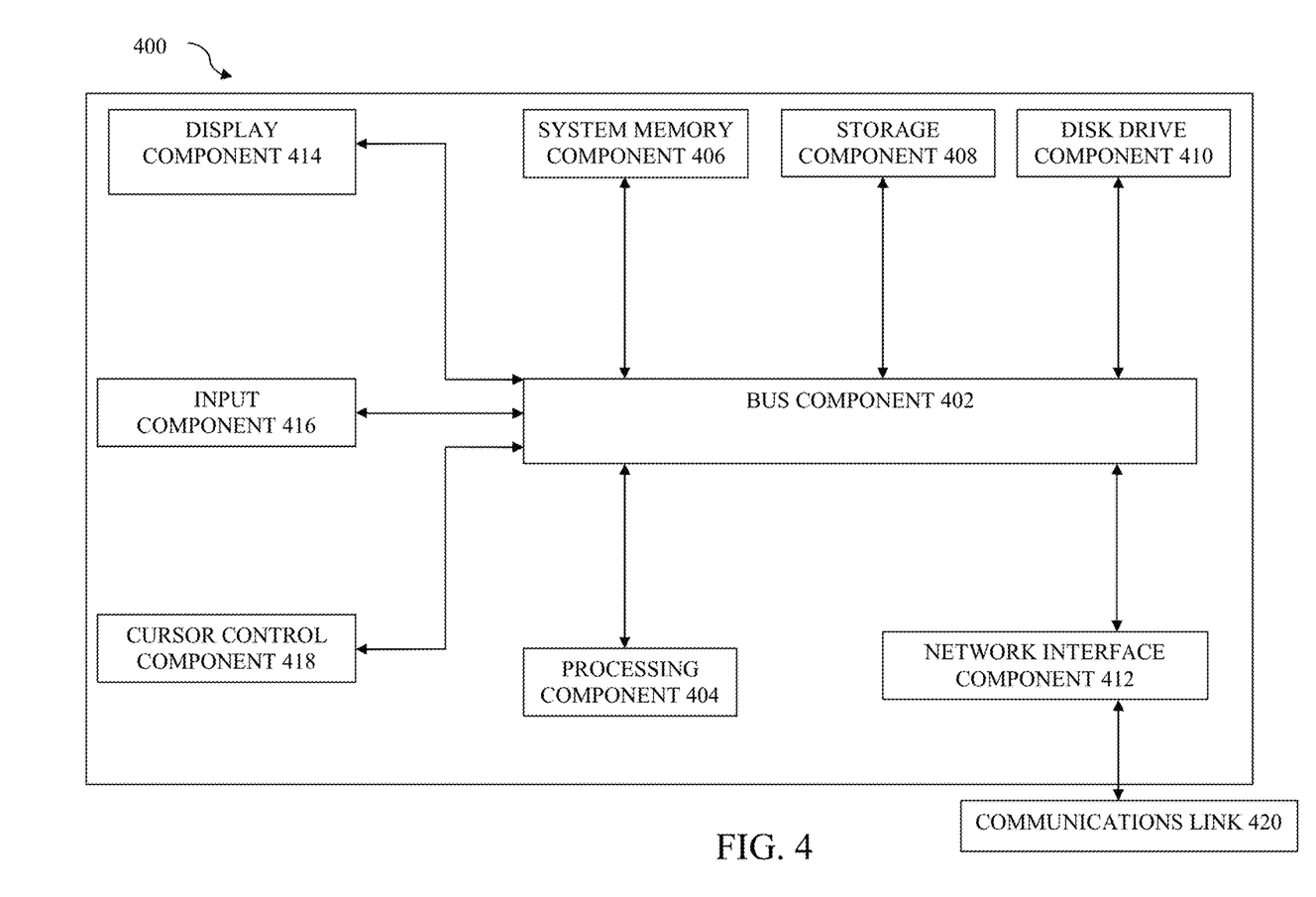
FIG. 4 is a block diagram of a computer system suitable for implementing one or more components in FIG. 1 according to an embodiment of the present disclosure.

Referring now to FIG. 4, illustrated is a block diagram of a system 400 suitable for implementing embodiments of the present disclosure, including client device 102, contact center 110, database module 120, scoring module 130, and predictive module 140 depicted in FIG. 1. System 400, such as part a computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to receive a communication between an agent and prospect, score the communication for a plurality of categories using at least one linguistic algorithm, use the scores to determine if a meaningful contact has been made, use the meaningful contact as an input in a predictive model, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods, apparatuses, computer readable media, and systems have been described according to one or more embodiments for evaluating a job candidate.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system for routing outbound communications to a prospect based on a prior communication, comprising:

an Internet Protocol Private Branch Exchange (IP/PBX) circuit; and a node comprising a processor and a non-transitory computer readable medium operably coupled thereto, the non-transitory computer readable medium comprising a plurality of instructions stored in association therewith that are accessible to, and executable by, the processor, where the plurality of instructions comprises:

instructions, that when executed, receive a prediction request from a user interface application on a client device;

instructions, that when executed, record a communication between an agent and a prospect on the client device and a telecommunication device of the prospect;

instructions, that when executed, transcribe the recorded communication from audio to text when the recorded communication is not in text form;

instructions, that when executed, determine which segments of the text of the recorded communication originated with the agent, and which segments of the text of the recorded communication originated with the prospect;

instructions, that when executed, apply linguistic analysis to the text of the recorded communication to determine a type of communication, a density of keywords relating to an organization, business, service or product, or any combination thereof, and a relationship of these keywords to each other during the recorded communication, wherein the keywords are selected from a library and are related to the type of communication;

instructions, that when executed, apply a linguistic-based psychological behavioral model to the text of the recorded communication to determine a personality type of the agent and the prospect based on identifying keywords relevant to the applied linguistic-based psychological behavioral model;

instructions, that when executed, separate agent voice data from the text of the recorded communication;

instructions, that when executed, calculate a weight of keywords identified in a first segment of the agent voice data relative to other keywords identified in the first segment or a second segment in close proximity to the first segment;

instructions, that when executed, calculate an amount of time in the agent voice data that the agent used the keywords relating to the organization, business, service, or product, or any combination thereof;

instructions, that when executed, determine whether the calculated amount of time exceeds a threshold time, wherein the threshold time is based on the type of communication;

instructions, that when executed, generate a predictive output for the user interface application on the client device based on the determined personality types of the agent and the prospect, the type of communication, and the calculated weighting of the identified keywords, when the calculated amount of time exceeded the threshold time;

instructions, that when executed, access a database storing agent history with a set of prospects having the determined personality type of the prospect;

instructions, that when executed, select an agent based on the agent history with the set of prospects having the determined personality type of the prospect;

instructions, that when executed, connect, via the IP/PBX circuit, the prospect on a subsequent communication to a workstation of the selected agent.

2. The system of claim 1, further comprising instructions, that when executed, determine at least an initial meaningful contact made between the agent and the prospect.

3. The system of claim 2, wherein the meaningful contact is used as an additional input to generate the predictive output.

4. The system of claim 1, further comprising instructions, that when executed, measure a level of engagement between the agent and the prospect.

5. The system of claim 4, further comprising instructions, that when executed, use the level of engagement as an additional input to determine if the communication is a meaningful contact.

6. The system of claim 1, further comprising instructions, that when executed, use demographic information, behavioral analytics data, prior communication information, or combinations thereof as additional inputs to generate the predictive output.

7. The system of claim 1, wherein the prospect is a prospective student.

8. The system of claim 7, further comprising instructions, that when executed, collect information regarding student attendance, participation, grades, or a combination thereof, and update the likelihood of the prospective student's action.

9. The system of claim 1, wherein the prospect is a prospective buyer.

10. The system of claim 9, further comprising instructions, that when executed, assign the prospective buyer to the selected agent.

11. The system of claim 10, wherein the agent history comprises history of an agent with the prospective buyer's personality type.

12. A method for routing outbound communications to a prospect based on a prior communication, which comprises:
receiving, by one or more processors, a prediction request from a user interface application on a client device;
recording, by the one or more processors, a communication between an agent and a prospect on the client device and a telecommunication device of the prospect, the communication having a density of keywords;
transcribing the recorded communication from audio to text when the recorded communication is not in text form;
determining which segments of the text of the recorded communication originated with the agent, and which segments of the text of the recorded communication originated with the prospect;
analyzing, by the one or more processors, the density of keywords relating to an organization, business, service or product, or any combination thereof, and a relationship of these keywords to each other, in the text of the recorded communication, wherein the keywords are selected from a library and are related to a type of communication;
applying, by the one or more processors, a linguistic-based psychological behavioral model to the text of the recorded communication to determine a personality type of the agent and the prospect based on identifying keywords relevant to the applied linguistic-based psychological behavioral model;
separating, by the one or more processors, agent voice data from the text of the recorded communication;
calculating, by the one or more processors, a weight of keywords identified in a first segment of the agent voice data relative to other keywords identified in the first segment or a second segment in close proximity to the first segment;
calculating, by the one or more processors, an amount of time in the agent voice data that the agent used the keywords relating to the organization, business, service or product, or any combination thereof;
determining, by the one or more processors, whether the calculated amount of time exceeds a threshold time, wherein the threshold time is based on the type of communication;
determining, by the one or more processors, if the recorded communication is a first meaningful contact based on the type of communication and the density of keywords during the recorded communication;
generating, by the one or more processors, a predictive output for the user interface application on the client device based on the determination of the personality types for the agent and the prospect, the type of communication, and the calculated weighting of the identified keywords, when the calculated amount of time exceeded the threshold time and when the recorded communication includes the first meaningful contact;
accessing, by the one or more processors, a database storing agent history with a set of prospects having the determined personality type of the prospect;
selecting, by the one or more processors, an agent based on the agent history with the set of prospects having the determined personality type of the prospect;
connecting, by an Internet Protocol Private Branch Exchange (IP/PBX) circuit, the prospect on a subsequent communication to a workstation of the selected agent.

13. The method of claim 12, which further comprises measuring a level of engagement between the agent and the prospect.

14. The method of claim 13, wherein the determining further comprises using the level of engagement to determine if the communication is the first meaningful contact.

15. The method of claim 12, which further comprises using demographic information, behavioral analytics data, prior communication information, or a combination thereof as an additional input to generate the predictive output.

16. The method of claim 12, wherein the calculated amount of time the agent voice data is associated with the density of keywords and is measured by an associated length of time in the agent voice data during which the agent is promoting a value of the service, product, or combination thereof to the prospect.

17. The method of claim 12, wherein the prospect is a prospective student.

18. The method of claim 17, wherein the contact type comprises an inquiry, enrollment, encouragement, or advice.

19. The method of claim 17, wherein the prospective student's action comprises applying to a school, visiting a school, enrolling in a program, attending a class, graduating from a class or a program, finishing at the top of a class, or a combination thereof.

20. The method of claim 17, which further comprises collecting information regarding student attendance, participation, grades, or a combination thereof, and updating the predictive output.

21. The method of claim 12, wherein the prospect is a prospective buyer.

22. The method of claim 21, which further comprises assigning the prospective buyer to the selected agent.

23. The method of claim 22, wherein the agent history comprises history of an agent with the prospective buyer's personality type.

24. A non-transitory computer readable medium comprising a plurality of instructions comprising:
    instructions, that when executed, receive a prediction request from a user interface application on a client device;
    instructions, that when executed, record a communication between an agent and a prospect on the client device and a telecommunication device of the prospect, the communication having a density of keywords;
    instructions, that when executed, transcribe the recorded communication from audio to text when the recorded communication is not in text form;
    instructions, that when executed, determine which segments of the text of the recorded communication originated with the agent, and which segments of the text of the recorded communication originated with the prospect;
    instructions, that when executed, search for keywords and phrases in the text of the recorded communication to determine a type of communication, the density of keywords used by a prospect relating to an organization, business, service, product, or any combination thereof, and a relationship of these keywords to each other during the recorded communication, wherein the keywords are selected from a library and are related to the type of communication;
    instructions, that when executed, apply a linguistic-based psychological behavioral model to the text of the recorded communication to determine a personality type of the agent and the prospect based on identifying keywords relevant to the applied linguistic-based psychological behavioral model;
    instructions, that when executed, separate agent voice data from the text of the recorded communication;
    instructions, that when executed, calculate a weight of keywords identified in a first segment of the agent voice data relative to other keywords identified in the first segment or a second segment in close proximity to the first segment;
    instructions, that when executed, calculate an amount of time in the agent voice data that the agent used the keywords relating to the organization, business, service, or product, or any combination thereof;
    instructions, that when executed, determine whether the calculated amount of time exceeds a threshold time, wherein the threshold time is based on the type of communication;
    instructions, that when executed, generate a predictive output for the user interface application on the client device based on the determined personality types of the agent and the prospect, the type of communication, and the calculated weighting of the identified keywords, when the calculated amount of time exceeded the threshold time;
    instructions, that when executed, access a database storing agent history with a set of prospects having the determined personality type of the prospect;
    instructions, that when executed, select an agent based on the agent history with the set of prospects having the determined personality type of the prospect; and
    instructions, that when executed, connect, via the IP/PBX circuit, the prospect on a subsequent communication to a workstation of the selected agent.

25. The non-transitory computer readable medium of claim 24, wherein the prospect is a prospective student or a prospective buyer.

26. The non-transitory computer readable medium of claim 24, further comprising instructions, that when executed, determine a number of meaningful contacts made between the agent and the prospect.

27. The non-transitory computer readable medium of claim 26, wherein the number of meaningful contacts is an additional basis for the generation of the predictive output.

28. An apparatus for routing outbound communications to a prospect based on a prior communication, which comprises:
    an Internet Protocol Private Branch Exchange (IP/PBX) circuit;
    a storage device storing a computer readable program; and
    a processor executing the computer readable program comprising:
        a database module adapted to:
            receive a prediction request from a user interface application on a client device; and
            record a communication between an agent and a prospect on the client device and a telecommunication device of the prospect, the communication having a density of keywords;
        a scoring module adapted to:
            transcribe the recorded communication from audio to text when the recorded communication is not in text form;
            determine which segments of the text of the recorded communication originated with the agent, and which segments of the text of the recorded communication originated with the prospect;
            apply at least one linguistic algorithm to determine a density of keywords relating to an organization, business, service or product, or any combination thereof, and a relationship of these keywords to each other during the recorded communication, in the text of the recorded communication to determine if the recorded communication is a meaningful contact by determining amount of time that is spent by the agent promoting a value of an organization, business, service, product, or any combination thereof, to the prospect during the recorded communication, wherein the keywords are selected from a library and are related to a type of communication;
            apply a linguistic-based psychological behavioral model to the text of the recorded communication to determine a personality type of the agent and the prospect based on identifying keywords relevant to the applied linguistic-based psychological behavioral model;
separate agent voice data from the text of the recorded communication;
calculate a weight of keywords identified in a first segment of the agent voice data relative to other keywords identified in the first segment or a second segment in close proximity to the first segment;
calculate the amount of time in the agent voice data that the agent used the keywords relating to the organization, business, service, or product, or any combination thereof; and
determine whether the calculated amount of time exceeds a threshold time;

a predictive module adapted to:
generate a predictive output for the user interface application on the client device based on an output from the scoring module including the determination that the contact was meaningful and if so, the determination of the personality types for the agent and the prospect, the type of communication, and the calculated weighting of the identified keywords, when the calculated amount of time exceeded the threshold time, wherein the threshold time is based on the type of communication;
access a database storing agent history with a set of prospects having the determined personality type of the prospect;
select an agent based on the agent history with the set of prospects having the determined personality type of the prospect; and
connect, via the IP/PBX circuit, the prospect on a subsequent communication to a workstation of the selected agent.

* * * * *